United States Patent
Hara

[11] Patent Number: 5,938,725
[45] Date of Patent: Aug. 17, 1999

[54] METHOD AND APPARATUS FOR DETERMINING DESTINATION ADDRESS OF ELECTRONIC MAIL (E-MAIL) MESSAGE FROM STORED E-MAIL MESSAGES

[75] Inventor: Minori Hara, Tokyo, Japan

[73] Assignee: NEC Corporation, Tokyo, Japan

[21] Appl. No.: 08/881,000

[22] Filed: Jun. 23, 1997

[30] Foreign Application Priority Data

Jun. 24, 1996 [JP] Japan .................................. 8-182847

[51] Int. Cl.⁶ .......................... G06H 13/00; H04L 12/00
[52] U.S. Cl. ........................................ 709/206; 709/245
[58] Field of Search ...................... 395/200.36, 200.75; 379/93.24; 707/3; 709/206, 245

[56] References Cited

U.S. PATENT DOCUMENTS

| | | | |
|---|---|---|---|
| 5,377,354 | 12/1994 | Scannell et al. | 395/650 |
| 5,634,005 | 5/1997 | Matsuo | 395/200.02 |
| 5,752,059 | 5/1998 | Holleran et al. | 395/800 |
| 5,799,151 | 8/1998 | Hoffer | 395/200.34 |
| 5,812,770 | 9/1998 | Sakai | 395/200.16 |
| 5,812,795 | 9/1998 | Horovitz et al. | 395/200.75 |
| 5,813,006 | 9/1998 | Polnerow et al. | 707/10 |

FOREIGN PATENT DOCUMENTS

| | | |
|---|---|---|
| 63-13545 | 1/1988 | Japan . |
| 2-289082 | 11/1990 | Japan . |
| 03-232341 | 10/1991 | Japan . |
| 04-130839 | 5/1992 | Japan . |
| 4-130839 | 5/1992 | Japan . |
| 4130839 | 5/1992 | Japan . |
| 6-326733 | 11/1994 | Japan . |
| 6326733 | 11/1994 | Japan . |
| 08-286988 | 11/1996 | Japan . |

Primary Examiner—Lance Leonard Barry
Attorney, Agent, or Firm—Sughrue, Mion, Zinn, Macpeak & Seas, PLLC

[57] ABSTRACT

In an electronic mail transmitting/receiving apparatus, received electronic mails are stored in a storage apparatus, and when a key word is inputted from an input apparatus, an electronic mail containing this key word is retrieved from this storage apparatus. Then, a mail address contained in the electronic mail retrieved by a retrieving unit is extracted as a mail address of a transmission destination candidate. The extracted mail address of the transmission destination candidate is outputted to an output apparatus, and a user selects as a transmission destination mail address, at least one mail address of the transmission destination candidate from the mail addresses of the transmission destination candidates outputted to this output apparatus. As a result, an electronic mail is transmitted to an apparatus having the selected transmission destination mail address.

30 Claims, 4 Drawing Sheets

Fig. 4

RETRIEVED RECEIVED ELECTRONIC MAIL

TRANSMISSION DESTINATION:ADDRESS 1 (OUR ADDRESS),
                         ADDRESS 2
TRANSMISSION DESTINATION OF GLOBAL
     ADDRESS COMMUNICATIONS:ADDRESS 3, ADDRESS 4
SENDER:ADDRESS 5
COMMUNICATION MESSAGE:

---------------------------------------------
---------------------------------------------
---------------------------------------------
---------------------------------------------
---------------------------------------------
---------------------------------------------
---------------------------------------------
---------------------------------------------
---------------------------------------------

↓

9

TRANSMISSION
DESTINATION SUBJECT:

ADDRESS 5, ADDRESS 2,
   ADDRESS 3, ADDRESS 4

METHOD AND APPARATUS FOR DETERMINING DESTINATION ADDRESS OF ELECTRONIC MAIL (E-MAIL) MESSAGE FROM STORED E-MAIL MESSAGES

BACKGROUND OF THE INVENTION

1. Field of the Invention

The present invention generally relates to a method for transmitting/receiving an electronic mail message among a plurality of computers connected via a network to each other, and to an electronic mail transmitting/receiving apparatus. More specifically, the present invention is directed to a technique for determining an address of a transmission destination for an electronic mail message.

2. Description of the Related Art

In most conventional electronic mail tools (software) for controlling transmission/reception operations of electronic mail messages, address notebooks are used in order to manage mail addresses. In general, in this type of address notebook, transmission destination addresses of electronic mail messages are managed in a hierarchical manner, based upon receivers of these electronic mails (for instance, names of offices, names of departments/divisions, and so on). In this hierarchical management case, addresses of transmission destinations are stored in regions denoted by the lowermost hierarchy of the relevant titles (for example, department/division names).

When an electronic mail message is transmitted, a user opens this address notebook and then visually retrieves the desired transmission destination address from the transmission destination addresses contained in this address notebook. Then, the user inputs the retrieved address of the desirable transmission destination into an electronic mail transmitting/receiving apparatus. As a consequence, the electronic mail message can be transmitted to the party in question.

Since the conventional electronic mail transmitting/receiving apparatus is arranged as described above, when the total number of mail addresses recorded in the address notebook is increased, a large number of retrieving operations, as well as lengthened operational time, are necessarily required until the desired transmission destination address can be acquired.

On the other hand, in general, electronic mail tools own the global address communication function by which an electronic mail is transmitted to a plurality of transmission destinations in a batch mode. When this global address communication function is utilized, a plurality of transmission destination addresses should be entered into an electronic mail transmitting/receiving apparatus. However, in such a case, when the desired transmission destination addresses are recorded over several relevant divisions of the address notebook, a user would retrieve/check the contents of this address notebook many times, so that a large number of retrieving/checking operations as well as a large amount of operation time are necessarily required until the desired transmission destination address could be found.

Also, in an address notebook, mail addresses are managed in a hierarchical manner with respect to topics (key words). If mail addresses recorded in an address notebook are managed both in the hierarchical manner based upon receivers of the electronic mails and also in the hierarchical manner with respect to topics, then a desired transmission destination address may be quickly found out. However, to execute this hierarchical manner with respect to topics, the mail addresses should be registered in the address notebook as to the relevant topics in addition to the relevant divisions. In other words, the same mail address must be registered in a duplicative manner. As a result, it is very cumbersome to register/change/manage the mail addresses, and furthermore, the resultant data amount of this address notebook is considerably increased.

As previously described, in the conventional electronic mail transmitting/receiving apparatus arranged in such a manner that a desired mail address is retrieved from the address notebook used to manage the electronic mails, it is, as a practical matter, difficult to quickly acquire a relevant mail address of a desired transmission destination.

To solve these problems, another conventional mail address retrieving method with using key words has been proposed in Japanese Laid-open Patent Application No. 6-326733 opened in 1994. In this mail retrieving method, both the IDs (mail addresses) used on the network and the key words relevant to these mail addresses are registered into the database. Then, a transmission document is combined with a key word, a request to send an electronic mail is accepted, and the electronic mail is transmitted to a transmission destination address whose key word is coincident with the above key word.

Similarly, another conventional electronic mail transmission technique has been disclosed in Japanese Laid-open Patent Application No. 4-130839 opened in 1992, in which the transmission destination is determined by using the key word, and thus the electronic mail is transmitted to this determined transmission destination. In this conventional technique, the key words and the data indicative of the terminals of the transmission destinations are previously registered while establishing relationships between these key words and data. When a request to send an electronic mail is issued which does not specify a transmission destination, a check is done as to whether or not the above-described key word is contained in this electronic mail. If this key word is contained in the electronic mail, then the electronic mail is transmitted to the terminal relevant to this checked key word.

However, since the above-described conventional methods as disclosed in Japanese Laid-open Patent Applications No. 6-326733 and No. 4-130839 require the key word to be registered, such an additional operation is necessarily required in addition to the other conventional electronic mail using method.

SUMMARY OF THE INVENTION

The present invention has been made to solve the above-described conventional problems, and therefore, has an object to provide an electronic mail transmitting/receiving method as well as electronic mail transmitting/receiving apparatus, capable of readily setting a transmission destination address of an electronic mail without executing a specific work such as registering of key words.

To achieve the above-described object, an electronic mail transmitting/receiving apparatus, according to an aspect of the present invention, is comprised of:

storage means for storing therein a received electronic mail;

input means for inputting a key word;

retrieving means for retrieving the electronic mail containing the key word inputting by the input means from the storage means;

extracting means for extracting a mail address contained in the electronic mail retrieved by the retrieving means as a mail address of a transmission destination candidate; and output means for outputting the mail address of the transmission destination candidate extracted by the extracting means.

In accordance with this electronic mail transmitting/receiving apparatus, when an electronic mail message is transmitted, a key word related to the content of this electronic mail message is inputted by using the input means, so that such an electronic mail message having this key word is retrieved from the electronic mail messages which were received in the past and have been stored in the storage means. In this case, the retrieving operation is carried out by checking as to whether or not the key word is present in the title and the communication message, which are contained in the electronic mail message. Subsequently, the mail address contained in the retrieved electronic mail message is extracted, and then is outputted as the mail address of the transmission destination candidate to the output means. When a desired mail address is selected by the selection means as the mail address of the transmission destination from the outputted mail addresses of the transmission destination candidates under this condition, the electronic mail can be transmitted to the apparatus having this mail address. As a result, the user is no longer required to retrieve the address notebook so as to designate the transmission destination address as in the conventional electronic mail transmitting/receiving apparatus. Therefore, the operations and the operation time required to transmit the electronic mail can be considerably reduced.

Also, according to the present invention, since the retrieving operation of an electronic mail message with the communication message containing the key word, and then the transmission destination address is acquired from the retrieved electronic mail message, a plurality of key words may combined with a transmission destination address of one electronic mail. Therefore, there is flexibility in setting of the key word, as compared with the above-explained conventional electronic mail message transmitting/receiving apparatus in which the transmission destination address of the electronic mail should be exclusively combined with the relevant key word. Also, since the key word registering work is no longer required, the extra work steps can be deleted.

Moreover, as to users of electronic mails, they can intuitively retrieve their desired mail address in accordance with the mail address managing (retrieving) manner of the present invention with using the key word, as compared with the mail address managing (relevant divisions) manner with using the address notebook of the conventional electronic mail transmitting/receiving method. As a consequence, the time and the workload required to accomplish the transmission (mail address) of the electronic mail can be shortened.

The above-described extracting means employed in the electronic mail transmitting/receiving apparatus, according to the present invention, may be arranged by that the extracting means extracts as the mail address of the transmission destination candidate, at least one of the following: a mail address of a sender contained in the retrieved electronic mail, mail addresses of transmission destinations other than an mail address of the electronic mail transmitting/receiving apparatus, and mail addresses of global address transmission destinations.

Generally speaking, there are many possibilities. That is, when an electronic mail message is received, a response to this received electronic mail message should be returned to a sender of this electronic mail message. Moreover, a content of this response to this received electronic mail message should be informed to the transmission destinations other than the electronic mail apparatus designated by this received electronic mail message, and also the transmission destinations of the global address communications. In accordance with this electronic mail transmitting/receiving apparatus of the present invention, since the mail addresses of the sender, the transmission destinations other than the apparatus, and the transmission destinations of the global address communications are outputted as the transmission destination candidates, the user can readily transmit the electronic mail by merely selecting his desired transmission destination from these outputted transmission destination candidates.

Also, the electronic mail transmitting/receiving apparatus, according to the present invention, further comprising:

priority setting means for setting priorities to the mail address of the sender contained in the retrieved electronic mail, the mail addresses of the transmission destinations other than the mail address of the electronic mail transmitting/receiving apparatus, and the mail addresses of the global address transmission destinations, respectively;

output means for outputting the mail addresses of the transmission destination candidates extracted by the extracting means in accordance with the priorities set by the priority setting means.

In accordance with the above-described arrangement, since the mail address of the transmission destination can be outputted while giving the priorities to the sender, the transmission destination other than the own apparatus, or the transmission destinations of the global address communications, it is possible to immediately designate the desirable transmission destination.

Also, an electronic mail transmitting/receiving method, according to another aspect of the present invention, is featured by comprising the steps of:

storing received electronic mails;

inputting a key word;

retrieving an electronic mail containing the inputted key word from the stored electronic mails;

extracting a mail address contained in the retrieved electronic mail as a mail address of a transmission destination candidate; and outputting the extracted mail addresses of the transmission destination candidates, wherein a mail address of a transmission destination is determined from the outputted mail addresses of the transmission destination candidate.

In this case, the step of extracting the mail address contained in the retrieved electronic mail messages includes extracting, at least one of the following: a mail address of a sender contained in the retrieved electronic mail message, mail addresses of transmission destinations other than a mail address of the electronic mail transmitting/receiving apparatus, and mail addresses of global address transmission destinations as the mail address of the transmission destination candidate.

Also, the electronic mail transmitting/receiving method of the present invention is may be arranged by further comprising the step of:

setting priorities to the mail address of the sender contained in the retrieved electronic mail, the mail addresses of the transmission destinations other than the mail address of the own electronic mail transmitting/receiving apparatus, and the mail addresses of the global address transmission destinations, respectively, wherein the step of outputting the extracted mail address of the transmission destination candidate includes outputting the mail addresses of the transmission destination candidates in accordance with the priorities.

Furthermore, the electronic mail transmitting/retrieving method may be arranged by that the step of retrieving the electronic mail message containing the inputted key word from the stored electronic mail messages includes performing the retrieving operation by checking whether or not a key word is present in a title and a communication message, which are contained in the stored electronic mail message.

BRIEF DESCRIPTION OF THE DRAWINGS

The present invention will be understood more clearly on reading the following description, given solely by way of example and made with reference to the accompanying drawings, in which:

FIG. 4 is an explanatory diagram for explaining a sequential operation for extracting a transmission destination candidate in the electronic mail transmitting/receiving apparatus according to an embodiment of the present invention.

DESCRIPTION OF THE PREFERRED EMBODIMENTS

Figure 1:
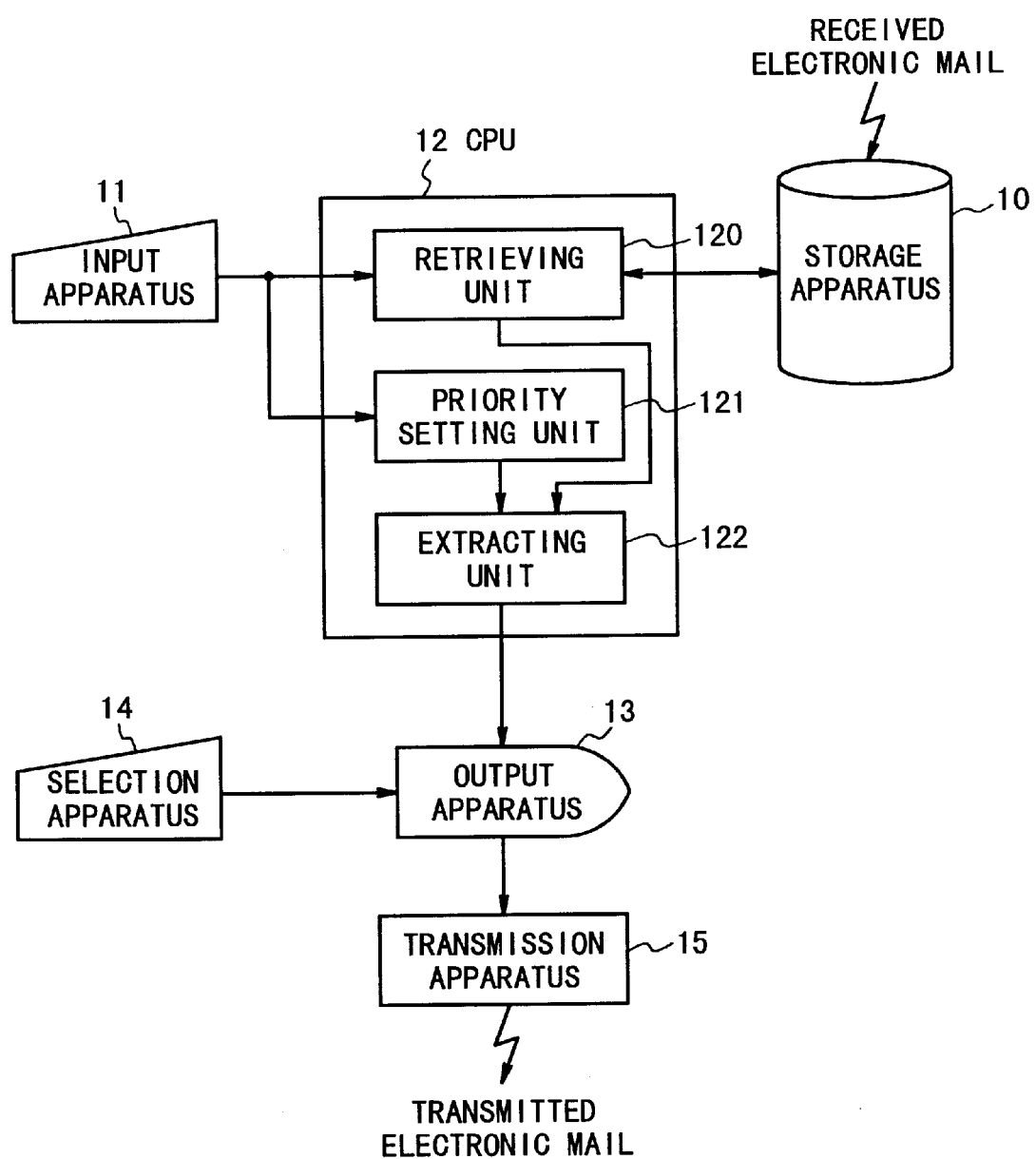
FIG. 1 schematically represents an overall arrangement 10 of an electronic mail transmitting/receiving apparatus according an embodiment of the present invention.
Figure 2:
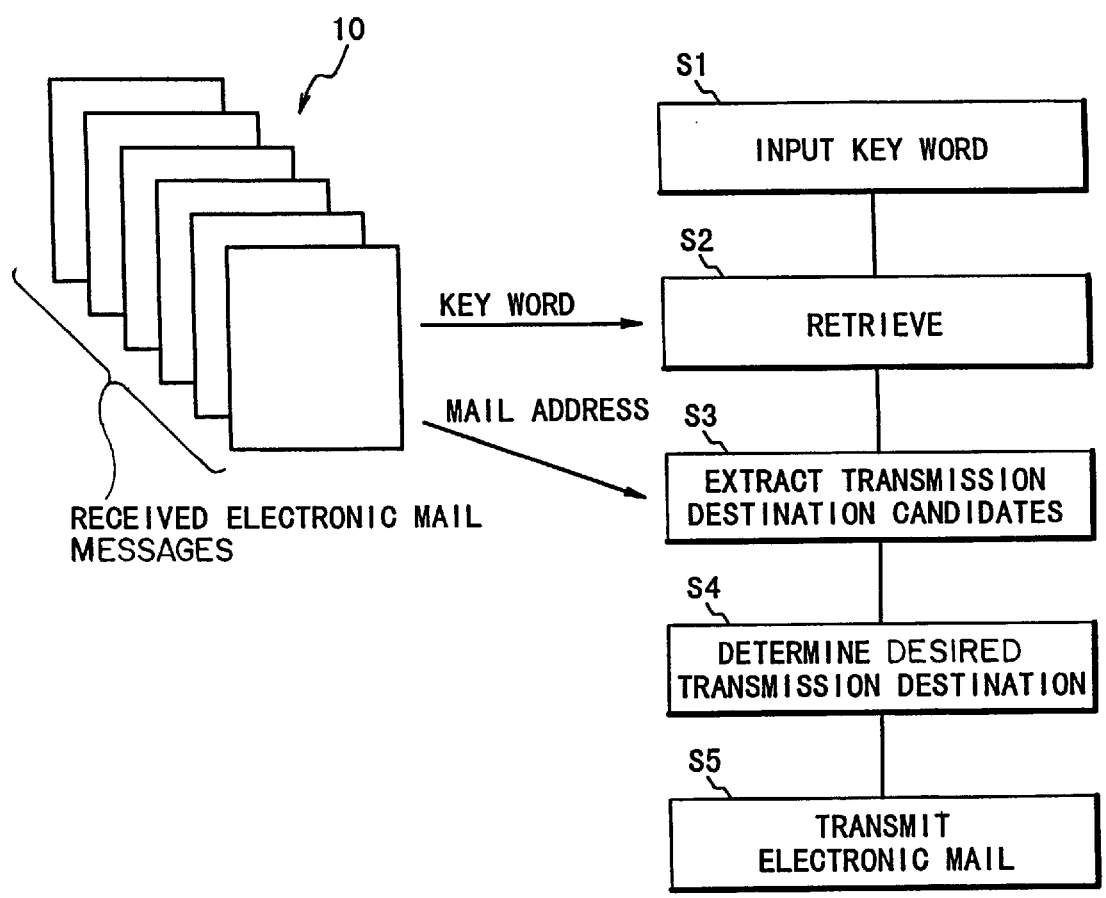
FIG. 2 is an explanatory diagram for explaining a structure and a process flow operation of the electronic main transmitting/receiving apparatus according to an embodiment of the present invention.

Referring now to drawings, various embodiments of electronic mail transmitting/receiving apparatus according to the present invention will be described in detail. FIG. 1 schematically represents an overall arrangement of an electronic mail transmitting/receiving apparatus accomplished in accordance with an embodiment of the present invention. FIG. 2 explanatorily indicates a structure and a process flow operation of the electronic mail transmitting/receiving apparatus according to an embodiment of the present invention.

As illustrated in FIG. 1, the electronic mail transmitting/receiving apparatus according to an embodiment of the present invention is arranged by a storage apparatus 10, an input apparatus 11, a CPU (central processing unit) 12, an output apparatus 13, a selection apparatus 14, and a transmission apparatus 15.

The storage apparatus 10 may be constituted by a readable/writable storage apparatus such as a hard disk apparatus, a floppy disk apparatus, or an IC memory. In this storage apparatus 10, received electronic mail messages are stored. The contents of this storage apparatus 10 are read out by the CPU 12. The input apparatus 11 may be arranged by an apparatus capable of inputting a character string (for instance, a keyboard and a voice input apparatus). This input apparatus 11 is used to input a key word. The key word entered from this input apparatus 11 is supplied to the CPU 12.

The CPU 12 contains a retrieving unit 120, a priority setting unit 121, and an extracting unit 122. The retrieving unit 120 retrieves an electronic mail message containing a key word inputted by the input apparatus 11 from the storage apparatus 10. The retrieving unit 120 compares/identifies the contents (character strings) of the received electronic mail messages stored in the storage apparatus 10 with the key word inputted by the input apparatus 11 to thereby retrieve such a received electronic mail message having the same character string as the key word. The electronic mail message retrieved in this retrieving unit 120 is sent to the extracting unit 122.

It should be noted that the priority setting unit 121 is optionally employed. This priority setting unit 121 stores therein information used to designate the priority entered from, for instance, the input apparatus 11. This information is used to give the priorities to a mail address of a message sender, mail addresses of transmission destinations other than the own apparatus, and mail addresses of global address transmission destinations. The information stored in this priority setting unit 121 is sent to the extracting unit 122.

The extracting unit 122 extracts the mail addresses contained in the electronic mail messages retrieved from the retrieving unit 120 in an order determined in accordance with the priority set by the priority setting unit 121. The mail address extracted by this extracting unit 122 is used as a mail address of a transmission destination candidate. This mail address of the transmission destination candidate is supplied to the output apparatus 13.

The output apparatus 13 may be constructed of a display device such as a CRT (cathode-ray tube) or an LCD (liquid crystal display). The above-described mail address extracting unit 122 employed in the CPU 12 is outputted to this output apparatus 13. The selection apparatus 14 may be arranged by, for example, a keyboard, a pointing device, or other devices. This selection apparatus 14 is used to select a desired mail address of the transmission destination candidate from a plurality of mail addresses of the transmission destination candidates which are outputted to the output apparatus 13. The mail address selected by the selection apparatus 14 from the plural mail addresses of the transmission destination candidates outputted to the output apparatus 13 is furnished as a mail address of a transmission destination to the transmission apparatus 15.

The transmission apparatus 15 may be constituted by, for instance, a communication control apparatus. This transmission apparatus 15 transmits the electronic mail message to such an apparatus having the mail address of the transmission destination derived from the output apparatus 13.

Next, a description will now be made of operations of the above-explained electronic mail transmitting/receiving apparatus with reference to FIG. 2. In this electronic mail transmitting/receiving apparatus, when an electronic mail message is transmitted, a user first inputs a key word related to the content of this electronic mail message by employing the input apparatus 11 (step S1). As a result, the retrieving unit 120 commences the retrieving operation (step S2). The retrieving unit 120 sequentially reads the received electronic mail messages which have been stored in the storage apparatus 10, and then compares/identifies the contents of the stored electronic mail messages with the key word. It should be understood that no specific key word registered by the user exists in these received electronic mail messages. As a consequence, the character strings contained in the titles and the communication messages of the received electronic mails are compared/identified with the key word.

Subsequently, the extracting unit 122 extracts the mail addresses of transmission destination candidates from the electronic mail messages containing the key word, which are retrieved by the retrieving unit 120 (step S3). Next, a user determines a mail address of a transmission destination to which the electronic mail message is actually transmitted, from the extracted transmission destination candidates (step S4). This determination is carried out by selecting the mail addresses of the transmission destination candidates outputted to the output apparatus 13 by the selection apparatus 14. Then, the transmission apparatus 15 transmits the electronic mail message to the determined transmission destination (step S5).

Figure 3:
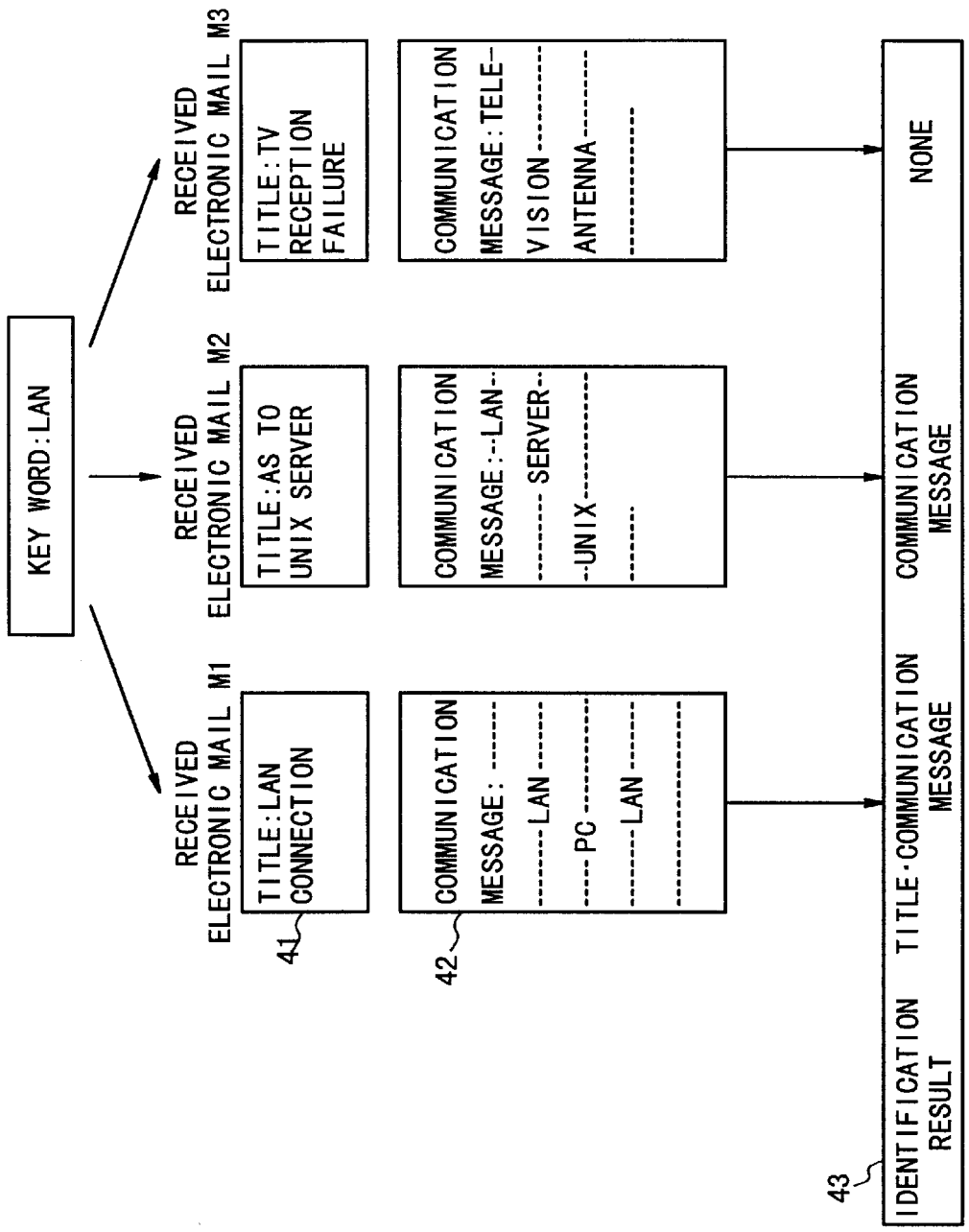
FIG. 3 is an explanatory diagram for explaining a comparing/identifying sequential operation of the electronic mail received by the electronic mail transmitting/receiving apparatus according to an embodiment of the present invention.

Referring now to FIG. 3, the retrieving process operation executed by the retrieving unit 120 at the above-described step S2, namely the sequential operation for comparing/identifying the key word with the contents of the received electronic mails will be described more in detail. It is assumed in the example shown in FIG. 3 that three sets of received electronic mails M1, M2, M3 have been stored in the storage apparatus 10. Also, it is assumed that a character string "LAN" is entered as the key word.

In the retrieving unit 120, the key word "LAN" entered by the input apparatus 11 is compared/identified with contents of title portions 41 and of communication message portions 42 of the respective received electronic mails M1, M2, and M3. In the example shown in FIG. 3, in the received electronic mail M1, the character strings "LAN" can be seen from both the title portion 41 and the communication message portion 42. In the received electronic mail M2, the character string "LAN" can be seen only from the communication message portion 42. In the received electronic mail M3, no character string "LAN" can be observed. As a result of this comparison/identification, an identification result 43 is obtained.

Next, the extracting process operation executed by the extracting unit 122 at the step S3, namely the sequential operation for extracting the transmission destination candidate from the retrieved received electronic mail messages, will now be described more in detail with reference to FIG. 4.

The extracting unit 122 extracts the mail address of the transmission destination candidate from the retrieved electronic mail messages by using the key word. As an object to be extracted, there are a mail address of desired destination, mail addresses of destinations of global address communications (namely, destination of copies), and a mail address of the sender. It should be noted that since the retrieved electronic mail message corresponds to such an electronic mail in the apparatus, the mail address of the apparatus is contained within the destinations. As a consequence, the desired transmission destination candidate is extracted from the destinations, the destinations of the global address communications (namely, destinations of copies), and the sender, excluding the sender's own address in accordance with the designated priority. In an example shown in FIG. 4, the priority of the transmission destination candidates is set in this order: the sender, the destinations, and the destinations (namely, destinations of copies). Then, the transmission destination candidate is extracted in accordance with this priority.

What is claimed is:

1. An electronic mail transmitting/receiving apparatus comprising:

a store storing therein a plurality of electronic mail messages;

an input inputting at least one key word;

a retriever retrieving those electronic mail messages containing said at least one key word from stored said plurality of electronic mail messages; and an extractor that extracts mail addresses contained within said retrieved electronic mail messages, said extracted mail addresses becoming transmission destination candidate mail addresses.

2. The electronic mail transmitting/receiving apparatus as claimed in claim 1, wherein said extractor extracts, as said transmission destination candidate mail addresses, at least one mail address of a sender contained in said retrieved electronic mail message, the mail addresses of transmission destinations other than the mail address of the electronic mail transmitting/receiving apparatus, or the mail addresses of global address transmission destinations.

3. The electronic mail transmitting/receiving apparatus as claimed in claim 2, wherein said electronic mail transmitting/receiving apparatus further comprises:

an output for outputting said transmission destination candidates mail addresses.

4. The electronic mail transmitting/receiving apparatus as claimed in claim 1, wherein said retriever checks if said at least one key word is present within each electronic mail message of stored said plurality of electronic mail messages.

5. The electronic mail transmitting/receiving apparatus as claimed in claim 3, wherein said electronic mail transmitting/receiving apparatus further comprises:

a selector for selecting a final transmission destination mail address from said transmission destination candidate mail addresses; and a transmitter that transmits an electronic mail message to an apparatus identified by said final transmission destination mail address.

6. The electronic mail transmitting/receiving apparatus as claimed in claim 3, wherein said electronic mail transmitting/receiving apparatus further comprises:

a prioritizer that prioritizes said transmission destination candidate mail addresses.

7. The electronic mail transmitting/receiving apparatus as claimed in claim 6, wherein said output outputs said transmission destination candidate mail addresses in accordance with priorities set by the prioritizer.

8. The electronic mail transmitting/receiving apparatus as claimed in claim 3, wherein said output is a electronic display apparatus.

9. The electronic mail transmitting/receiving apparatus as claimed in claim 5, wherein said selector is a keyboard device.

10. The electronic mail transmitting/receiving apparatus as claimed in claim 5, wherein said selector is a pointing device.

11. The electronic mail transmitting/receiving apparatus as claimed in claim 5, wherein said transmitter is a communication control device.

12. The electronic mail transmitting/receiving apparatus as claimed in claim 1, wherein said store is a disk storage apparatus.

13. The electronic mail transmitting/receiving apparatus as claimed in claim 1, wherein said store is an electronic memory.

14. The electronic mail transmitting/receiving apparatus as claimed in claim 1, wherein said input is a keyboard apparatus.

15. The electronic mail transmitting/receiving apparatus as claimed in claim 1, wherein said input is a voice-driven apparatus.

16. A method for transmitting/receiving an electronic mail, comprising the steps of:

storing a plurality of electronic mail messages;

inputting at least one key word;

retrieving those electronic mail messages containing said at least one key word from stored said plurality of electronic mail messages;

extracting mail addresses contained within said retrieved electronic mail messages, said extracted mail addresses becoming transmission destination candidate mail addresses.

17. The electronic mail transmitting/retrieving method as claimed in claim 16, wherein the step of extracting, as said transmission destination candidate mail addresses, extracts at least one mail address of a sender contained in said retrieved electronic mail message, the mail addresses of transmission destinations other than the mail address of the electronic mail transmitting/receiving apparatus, or the mail addresses of global address transmission destinations.

18. The electronic mail transmitting/retrieving method as claimed in claim 17, further comprising the step of:

outputting said transmission destination candidate mail addresses.

19. The electronic mail transmitting/retrieving method as claimed in claim 18, further comprising the step of:

prioritizing said transmission destination candidate mail addresses.

20. The electronic mail transmitting/retrieving method as claimed in claim 19, further comprising the step of:

outputting said transmission destination candidate mail addresses in accordance with said prioritization.

21. The electronic mail transmitting/retrieving method as claimed in claim 16, wherein the step of retrieving includes checking if said at least one key word is present within each electronic mail message of stored said plurality of electronic mail messages.

22. The electronic mail transmitting/retrieving method as claimed in claim 16, further comprising the steps of:

selecting a final transmission destination mail address from said transmission destination candidate mail addresses; and transmitting an electronic mail to an apparatus identified by said final transmission destination mail address.

23. The electronic mail transmitting/retrieving method as claimed in claim 22, wherein the transmission destination candidate addresses are output to an electronic display apparatus.

24. The electronic mail transmitting/retrieving method as claimed in claim 22, wherein the selection step is performed using a keyboard device.

25. The electronic mail transmitting/retrieving method as claimed in claim 22, wherein the selection step is performed using a pointing device.

26. The electronic mail transmitting/retrieving method as claimed in claim 22, wherein the electronic mail message is transmitted using a communication control device.

27. The electronic mail transmitting/retrieving method as claimed in claim 16, wherein the step of storing includes placement of electronic mail messages in a disk storage apparatus.

28. The electronic mail transmitting/retrieving method as claimed in claim 16, wherein the step of storing includes placement of electronic mail messages in an electronic memory.

29. The electronic mail transmitting/retrieving method as claimed in claim 16, wherein the step of inputting is performed with a keyboard apparatus.

30. The electronic mail transmitting/retrieving method as claimed in claim 16, wherein the step of inputting is performed with a voice-driven apparatus.

* * * * *